United States Patent [19]

Landau

[11] Patent Number: 5,638,164
[45] Date of Patent: Jun. 10, 1997

[54] APPARATUS AND METHOD FOR LASER IMAGING

[75] Inventor: Uzi Landau, Kibbutz Shluchot, Israel

[73] Assignee: Development Authority, Rafael State of Israel—Ministry of Defense Armament, Haifa, Israel

[21] Appl. No.: 512,901

[22] Filed: Aug. 9, 1995

[30] Foreign Application Priority Data

Aug. 9, 1994 [IL] Israel ........................... 110.611

[51] Int. Cl.⁶ .................. G01C 3/08; G01B 11/26; H04N 7/18
[52] U.S. Cl. .................. 356/5.01; 250/342; 348/144; 356/141.1; 382/103; 382/106
[58] Field of Search ........................ 356/5.01, 141.1, 356/141.4, 376, 380; 250/342; 348/164–168, 143–148; 382/103, 106

[56] References Cited

U.S. PATENT DOCUMENTS

| | | |
|---|---|---|
| 3,644,043 | 2/1972 | Jones et al. . |
| 4,497,065 | 1/1985 | Tisdale et al. . |
| 4,518,256 | 5/1985 | Schwartz . |
| 5,309,212 | 5/1994 | Clark . |
| 5,528,354 | 6/1996 | Uwira ........................... 356/5.01 |

OTHER PUBLICATIONS

Andressen, C.C., A 1.32 micron, long–range, solid–state, imaging LADAR, *SPIE*, vol. 1694, 1992, pp. 121–130.

Gustavson, R.L., et al., Diode–laser radar for low–cost weapon guidance, *SPIE*, vol. 1633 Laser Radar VII, 1992, pp. 21–32.

*Primary Examiner*—Stephen C. Buczinski
*Attorney, Agent, or Firm*—Helfgott & Karas, P.C.

[57] ABSTRACT

This invention discloses a laser imager for imaging a scene having targets comprising a laser scanner operative to scan the scene at a given spacing with a laser beam, a receiver which receives laser light reflected from the scene and determines the range and reflectance of an object reflecting said laser light at various scan positions and control logic which changes the given spacing in response to the determined range.

24 Claims, 6 Drawing Sheets

APPARATUS AND METHOD FOR LASER IMAGING

FIELD OF THE INVENTION

The present invention relates to laser radar systems and more specifically to a target detection process using a laser radar.

BACKGROUND OF THE INVENTION

Laser radar (LADAR) systems are useful as sensors for autonomous targeting guided weapons. LADAR systems function by scanning one or more laser beams over a target range and receiving beams reflected from objects situated within the target range. The reflected laser beams provide, via range finding apparatus, reflectance data including the distance to an object and the intensity of the reflected beams so that a profile of the target range can be constructed. False-color or gray-scale range and reflectance intensity images of the target range can be displayed based on the target range profile.

A non-real-time single channel diode laser radar and a real-time 24 channel scanning diode laser array implementation of an imaging LADAR system is described in Gustavson et al., "Diode-laser radar for low-cost weapon guidance", SPIE Vol. 1633 Laser radar VII (1992), pp. 21–32. A more powerful diode pumped Q-switched laser employed in an imaging LADAR system is described in Andressen C. C., "A 1.32 micron, long range, solid state, imaging LADAR", SPIE Vol. 1694 (1992), pp. 121–130. The disclosures of the preceding articles are hereby incorporated by reference herein.

A number of problems arise with existing LADAR systems. Typically, LADAR systems scan a large area for targets and collect a large amount of reflectance data which must be processed in order to determine potential targets. The response time necessary to locate, recognize, and classify targets is an important factor in targeting. Both sides in a conflict may employ LADAR systems for target detection so response time can become a critical factor.

There are two main limitations on response time. First, a scanning range finder typically scans a single laser over the range finder's entire field of view to collect reflectance data. The time required to finely scan a laser beam over a range finder's entire field of view, which is typically a large area, can be significant. The traditional solution to this problem is to employ a plurality of lasers having offset fields of view that collectively span the range finder's entire field of view. In this manner, reflectance data for a large field of view is quickly collected. However, the cost and complexity of such LADAR systems is high.

Second, response time is bounded from below by the time required for target recognition software to verify a target. Additionally, there is the general problem of target recognition and classification, which is particularly acute in high-clutter environments. For example, since it is necessary to discriminate background objects such as large rocks, a target recognition process must have very good discrimination characteristics.

A target classification process described in Gustavson et al., a reference cited above, utilizes a recognizer module which scans through an elevation image and identifies and labels all objects in the elevation image based on a comparison with pre-stored target signatures. A further pass through the elevation image then attempts to label sub-regions within each object. From this, a labeled image mask is produced which is fed to a classifier module. The classifier module extracts one object at a time for target classification, and discriminatory rules are applied until a target is verified. An aim point is then computed.

A target classification process described in Andressen, cited above, utilizes pre-stored critical points on target signatures at a number of aspect angles for comparison purposes. Points on the image derived from the LADAR are scored as to the likelihood that they belong to one of the pre-stored critical points.

Conventional laser scanning systems are described in *Laser beam scanning*, Gerald F. Marshall (Ed.), Marcel Dekker, Inc., 1985.

A document entitled "SIcam™—A PC compatible digital instrumentation camera incorporating a large pixel 512×512 format charge injection device (CID)", by CID Technologies Inc. (CIDTEC), Liverpool, N.Y., describes a microprocessor-based camera which skims accumulated pixel charge and/or non-destructively reads pixel information, enabling the system user to monitor events and dynamically adapt application exposure in real-time for the entire array of individual pixels.

The disclosures of all of the above publications are hereby incorporated by reference.

SUMMARY OF THE INVENTION

Figure 1:
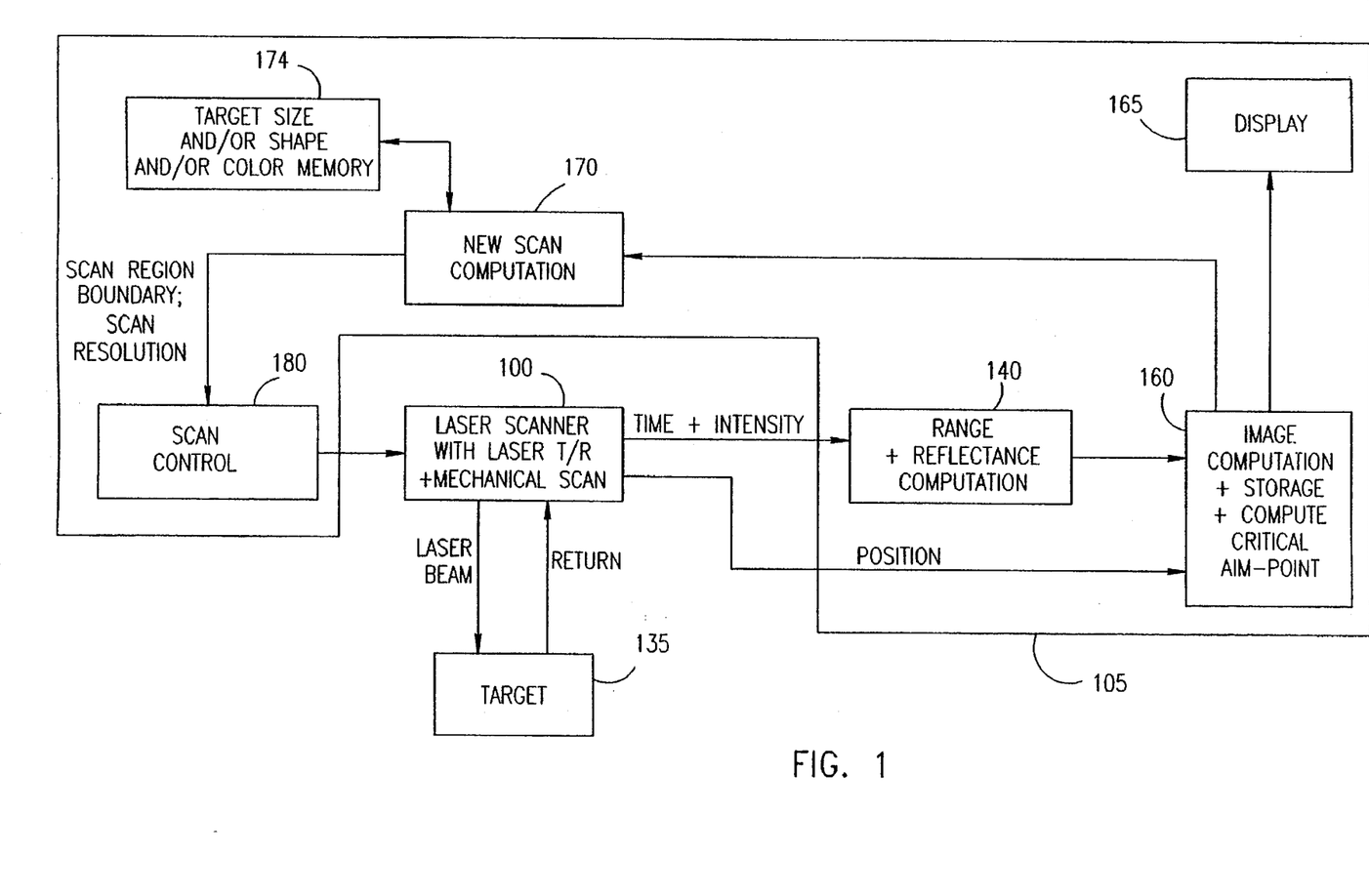
FIG. 1 is a schematic block diagram of a LADAR system constructed and operative in accordance with a preferred embodiment of the present invention.
Figure 2A:
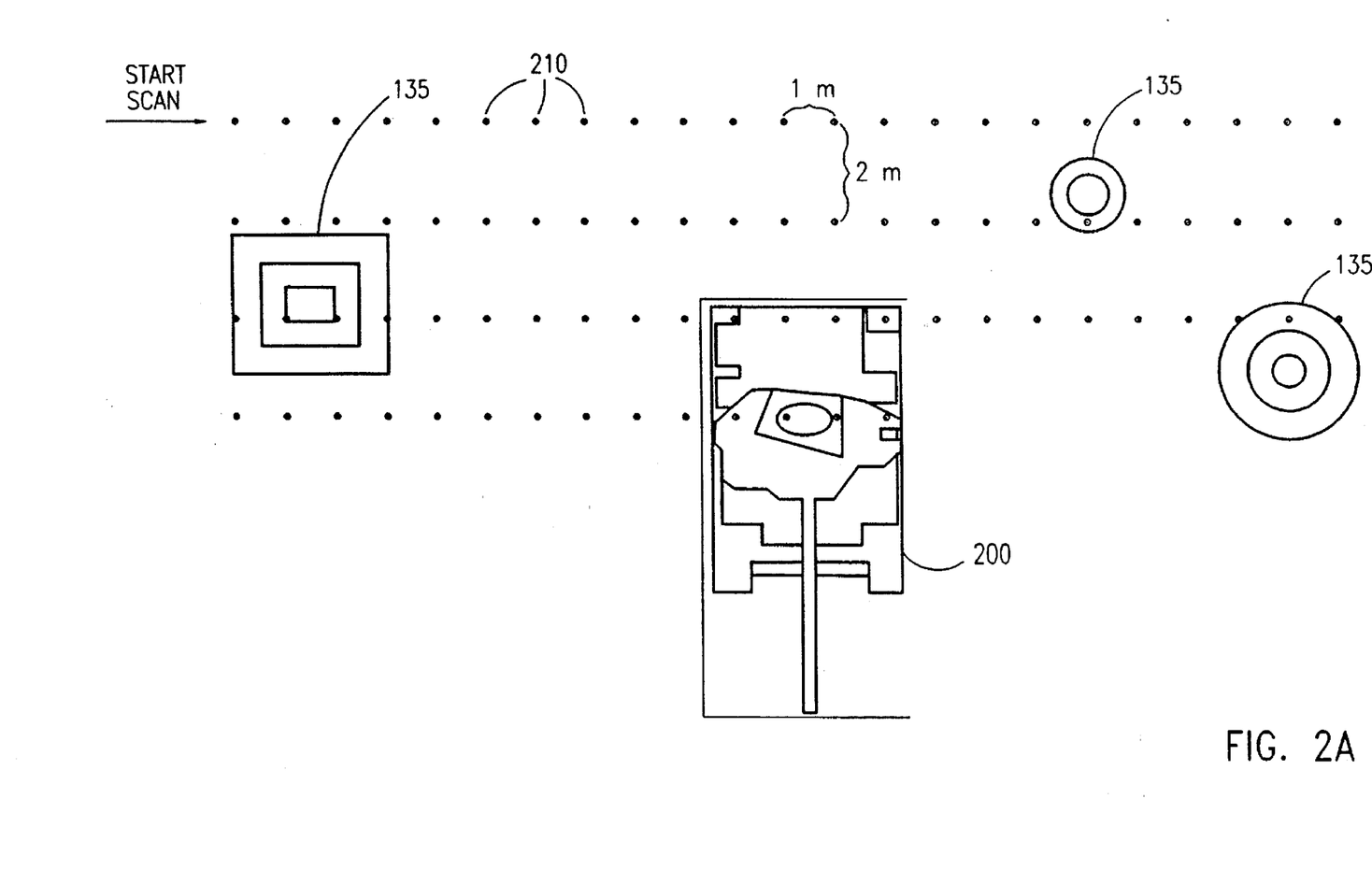
FIG. 2A is an illustration from above of a low resolution scan of a field of view performed by the system of FIG. 1 when in a sweeping mode.
Figure 2B:
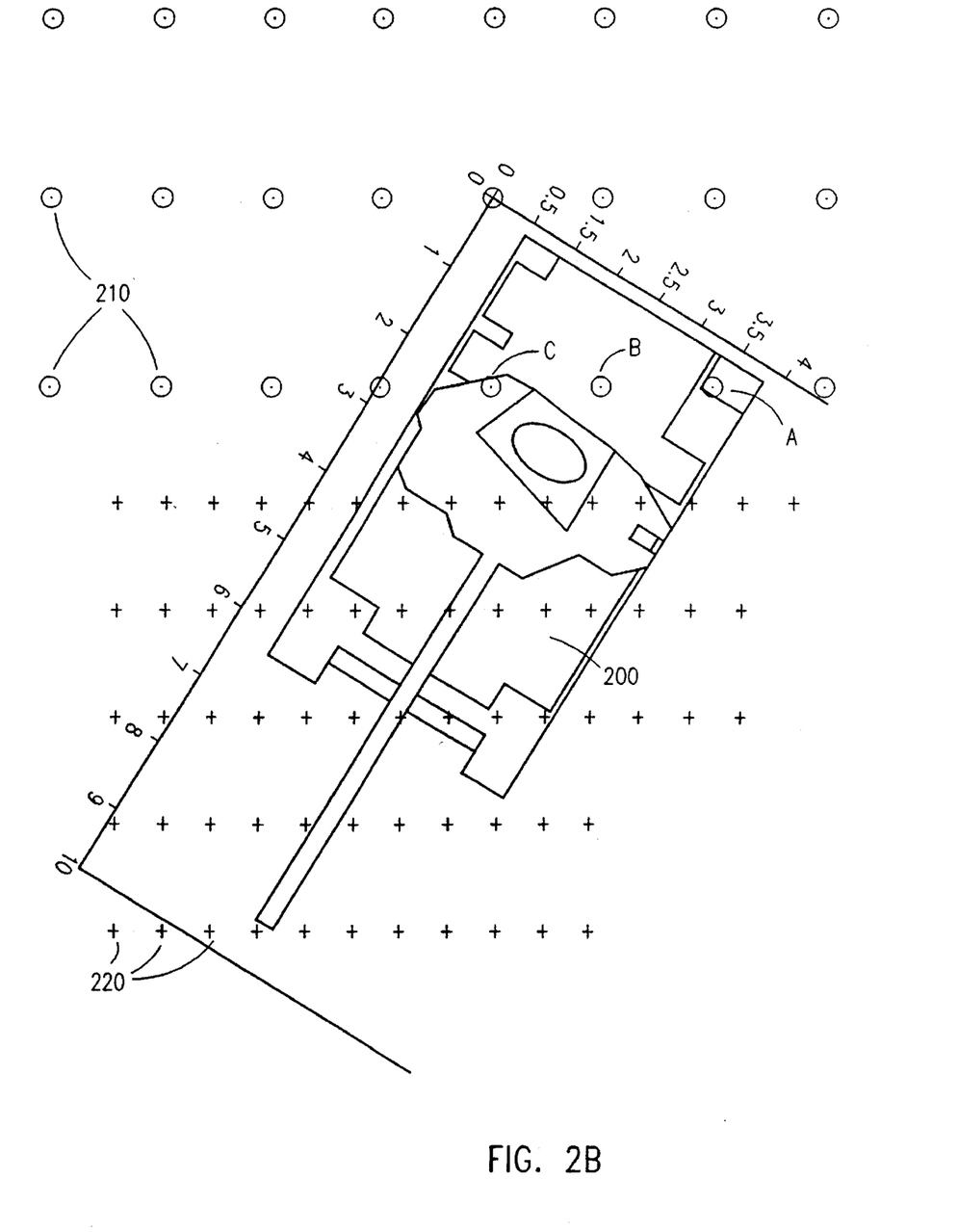
FIG. 2B is an illustration from above of the system of FIG. 1 in transition from the sweeping mode of FIG. 2A to a segmentation/correlation mode.

The present invention provides a laser imaging method for imaging a scene including targets, the method including:

a. Scanning at least a portion of the scene at a first relatively low resolution with a laser beam and analyzing the light reflected back, only until a region of interest satisfying a general target-characterizing criterion is found. The general criterion may, for example, include a step at least 1.5 m high and at least 2 m long. In FIG. 2B, the criterion is met because three scan locations A, B and C fall "inside" the tank object which is raised at least 1.5 m relative to the ground and the distance between sweeping mode scan locations is 1 m, as shown in FIG. 1.

b. Scanning at least a portion of the region of interest at a second resolution higher than the first resolution with the laser beam, only until a segment satisfying a specific target-characterizing criterion is found. The specific criterion may, for example, include specific segment dimensions, such as a raised location at least 1.5 m high, at least 3 m long and at least 4 m wide; and, preferably, c. Scanning at least a portion of the segment at a third resolution higher than the second resolution with the laser beam, only until a highly characteristic target feature is found. If the target is a tank and the third resolution is 8 scan locations per meter length and 3 scan locations per meter width, the highly characteristic target feature may, for example, include a 2 scan location×8 scan location plateau (characteristic of the tank's gun barrel) adjacent an 8 scan location×8 scan location plateau (characteristic of the tank's turret).

The present invention provides a low target detection response time which is important for moving target detector systems because the difficulty of returning to the exact location of a target increases as the target detector moves further from the target. The present invention also requires less laser energy than conventional systems.

The present invention uses a scanning range finder preferably having a single laser beam which scans a designated area in a target range thereby yielding its profile. The system of the present invention preferably operates in one of three modes, sampling a designated area at a resolution which varies depending upon the mode of operation.

In a first mode of operation, termed herein the sweeping mode, a low resolution scan is employed to effectively cover a wide target area. As the target area is swept, "regions of interest" are identified based on given criteria including variations in the distance to an object and/or the beam's reflected intensity, which may indicate color variation, and/ or the size of an object detected in the target area. Once a region of interest is detected, the scanning resolution is increased, preferably doubled, and at least a portion of the region of interest is scanned at a higher resolution (second mode). Thus, the initial scan of a target area is equivalent to a filtering phase where unimportant or extraneous image information is quickly disposed of so that the single laser employed by the invention may scan, at a higher resolution, areas in the field of view that warrant closer inspection.

In the second mode of operation, which includes a segmentation process and a correlation process, at least a portion of a detected region of interest is scanned at a higher resolution thereby yielding a region of interest profile. In this mode, the measured profile, and measured reflectance data, are compared with pre-stored target signatures to determine if predetermined segment dimensions are identifiable.

In a third mode of operation, termed herein the verification mode, a further high resolution scan within the segment or plateau verifies or rules out presence of a target. If a target is identified, e.g. by identifying a crucial and characteristic object such as a tank turret—gun barrel junction, a suitable output message is generated and/or a critical aim-point for the tank is computed.

Optionally, a learning neural network system compares measured profile and reflectance data acquired in this mode against a known critical aim point for a pre-stored target signature.

Thus, the present invention provides quick, effective coverage of a wide area while employing only one, or at most a few scanning range finder and laser elements, thereby reducing the cost of a LADAR system.

There is thus provided in accordance with a preferred embodiment of the present invention a laser imager for imaging a scene having targets including a laser scanner operative to scan the scene at a given spacing with a laser beam, a receiver which receives laser light reflected from the scene and determines the range of an object reflecting the laser light at various scan positions, and control logic which changes the given spacing in response to the determined range.

Further provided in accordance with a preferred embodiment of the present invention is a laser imager for imaging a scene having targets including a laser scanner operative to scan the scene at a given spacing with the laser beam, a receiver which receives laser light reflected from the scene and determines the reflectance of an object reflecting the laser light at various scan positions, and control logic which changes the given spacing in response to the determined reflectance.

Still further in accordance with a preferred embodiment of the present invention the receiver is operative to determine the range of an object reflecting the laser light at a scan position, and the control logic is also responsive to the determined variations in range and reflectance.

Additionally in accordance with a preferred embodiment of the present invention the control logic changes the resolution of the scan in response to the results of a comparison between an array of values at scan positions and a pre-set array of values representing a target signature.

Also in accordance with a preferred embodiment of the present invention the values at scan positions represent target range.

Further in accordance with a preferred embodiment of the present invention the values at scan positions include target reflectance values.

Still further in accordance with a preferred embodiment of the present invention the laser source is a GaAs type laser.

Additionally in accordance with a preferred embodiment of the present invention the laser source is a NdYaG type laser.

Also in accordance with a preferred embodiment of the present invention the laser source is a NdYLF type laser.

There is additionally provided in accordance with a preferred embodiment of the present invention a laser imaging system for imaging a scene including targets, the system including a laser scanner operative to scan the scene at a given resolution with a laser beam, a laser receiver which receives and analyzes laser light reflected from the scene to determine candidate target locations, and a laser scanner controller operative to increase the resolution of the scan and to pinpoint the scan to at least one candidate target location.

Further in accordance with a preferred embodiment of the present invention the system includes a target size memory storing target size information wherein the laser receiver determines candidate target locations by comparing the size of identified objects with the target size information.

Still further in accordance with a preferred embodiment of the present invention the system includes a target shape memory storing target shape information wherein the laser receiver determines candidate target locations by comparing the shape of identified objects with the target shape information.

There is further provided in accordance with a preferred embodiment of the present invention a laser imaging method for imaging a scene including targets, the method including scanning at least a portion of the scene at a first resolution with a laser beam and analyzing the light reflected back, only until a region of interest satisfying a general target-characterizing criterion is found, and scanning at least a portion of the region of interest at a second resolution higher than the first resolution with the laser beam, only until a location satisfying a specific target-characterizing criterion is found.

Yet further in accordance with a preferred embodiment of the present invention the method includes scanning at least a portion of the specific criterion satisfying location at a third resolution higher than the second resolution with the laser beam, only until a highly characteristic target feature is found.

Additionally in accordance with a preferred embodiment of the present invention the system includes a target color memory storing target color information wherein the laser receiver determines candidate target locations by comparing the color of identified objects with the target color information.

There is further provided in accordance with a preferred embodiment of the present invention a method for 3D imaging of at least a portion of a scene, the method including generating a 3D representation of a first portion of the scene at a first resolution, and upon receipt of a control signal, generating a 3D representation of a second portion of the scene at a second resolution.

Still further in accordance with a preferred embodiment of the present invention the control signal includes an indication that a putative target has been encountered.

Yet further in accordance with a preferred embodiment of the present invention the second resolution is greater than the first resolution.

Also in accordance with a preferred embodiment of the present invention the method includes the step of generating a 3D representation of a third portion of the scene at a third resolution.

Further in accordance with a preferred embodiment of the present invention generating includes laser scanning a portion of the scene.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Reference is now made to FIG. 1 which depicts a schematic block diagram of a LADAR system constructed and operative in accordance with a preferred embodiment of the present invention.

A laser scanner 100 is connected to a computer and control module 105. Laser scanner 100 is aimed generally at a target range or scene including a plurality of targets 135 situated on a target range. Preferably, the scanner's field of view includes substantially all of the target range. The apparatus of FIG. 1 is operative to identify and verify targets and provide aiming instructions and/or a visual display for weaponry designed to destroy the targets.

The laser scanner 100 typically comprises a laser transmitter/receiver and apparatus for mechanically scanning an area, pixel by pixel, with a laser beam. The laser scanner may float or cruise at a suitable height, such as 500 m, or alternatively may be on the ground.

Suitable laser scanning systems are described in *Laser beam scanning*, Gerald F. Marshall (Ed.), Marcel Dekker, Inc., 1985.

A suitable commercially available laser scanner is marketed by General Scanners, Inc., Watertown, Mass., U.S.A.

The laser scanner 100 projects a laser beam out to a designated area in the field of view and receives a beam reflected back from target/s 135. The time of flight and intensity of the reflected beam at each laser position is sent to a range and reflectance computation module 140 wherein range and reflectance intensity values are computed. Reflectance variation is typically employed to determine the borders of areas to be scanned in the second and third modes of operations. Range variation is typically employed to identify 3D profiles such as steps, raised areas or plateaus.

Preferably, a GaAs type laser is employed by laser scanner 100 although alternative embodiments of the present invention use other laser types including NdYaG or NdYLF type lasers; still other types of lasers may also be used.

An image computation and storage module 160 receives a number of the computed range and reflectance intensity values along with the position of the laser for each range and reflectance intensity value, thereby yielding a profile of the designated area. The range, reflectance intensity and position values which constitute the profile will be hereinafter collectively referred to as an "image data matrix". Module 160 preferably generates an image of the profile on a display 165 such as a CRT, computer screen or video screen, using methods well known in the art. The displayed images vary, depending on the LADAR system's mode of operation, as described in greater detail hereinbelow.

Module 160 may comprise a suitably programmed conventional frame grabber such as the P360 Power Grabber, commercially available from Dipix Technology, marketed in Israel by Saar, Bezalel 50, Ramat Gan.

Preferably, in the first, sweeping mode, the boundaries of regions of interest are marked on an image of the target range on display 165. In the correlation and verification modes, the more finely resolved profiles of the region of interest are displayed on the video display 165. The display 165 preferably displays a representation of at least a portion of the field of view, including a plurality of subportions imaged in a corresponding plurality of resolutions.

The image data matrix from modules 140 and 100 is sent to a new scan computation module 170 via module 160. Module 170 performs an ongoing analysis, in parallel with the laser scanning process, of received indications of detected range and reflectance variations, and of current scanning location. Typically, the received indications are compared to known information regarding the size, shape and/or color of one or more targets. This analysis, a preferred embodiment of which is described below with reference to FIG. 3, generates scanning control instructions including a sequence of pairs of scan boundaries and scan resolutions.

The scan boundary information indicates a portion of the field of view which is to be scanned, and the scan resolution information indicates the resolution of the scan, along each dimension, in the indicated field of view portion.

The target size, shape and/or color information may be stored in any suitable digital memory 174, such as a hard disk.

The scan resolution and boundary parameters are sent to a scan control module 180 which controls the mechanical positioning of laser scanner 100, based on the scan resolution and boundary parameters. Module 180 sends control signals to control motors associated with laser scanner 100, thereby controlling the scanning path of the laser beam, as is well known in the art.

Figure 3:
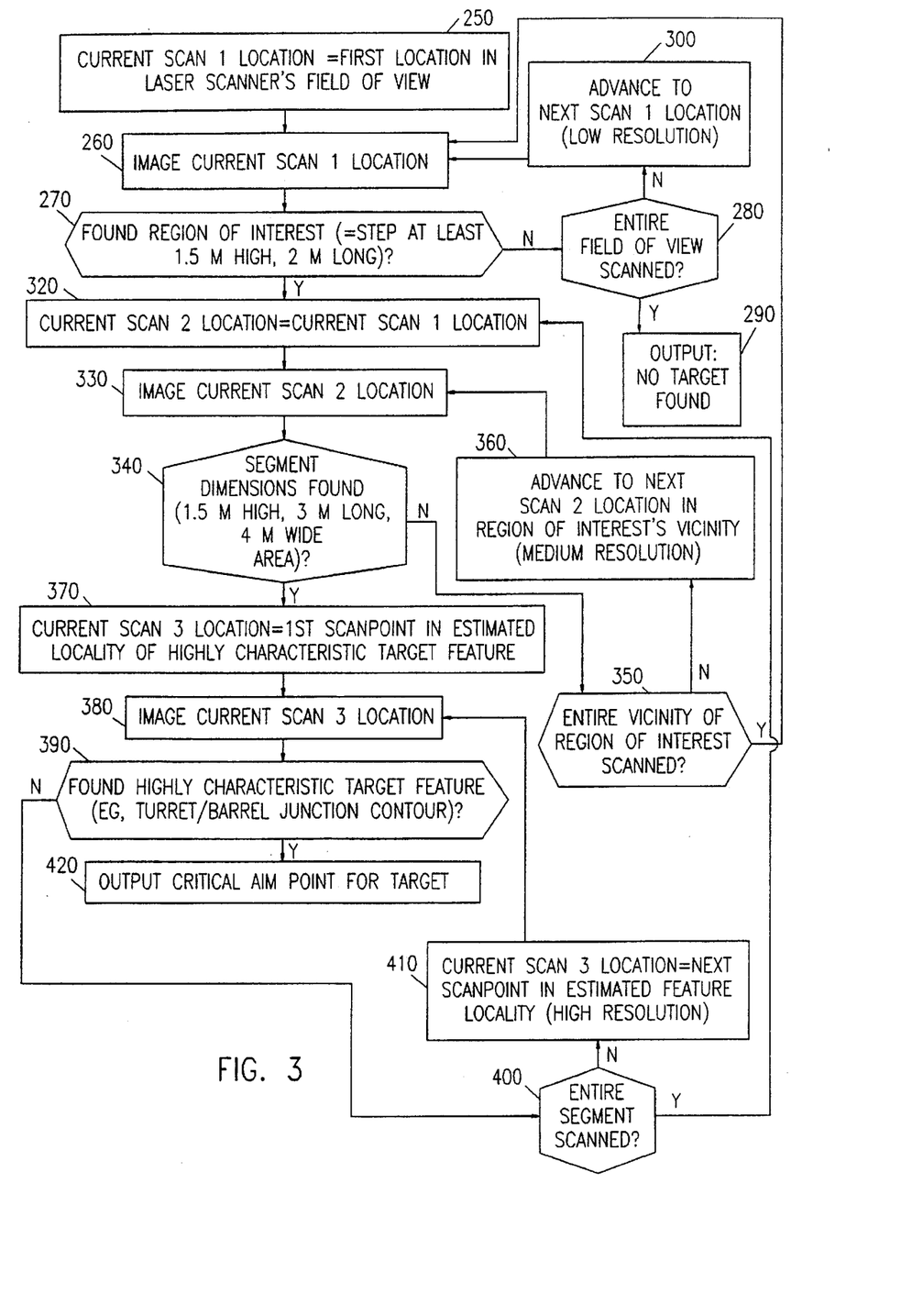
FIG. 3 is a flowchart illustrating a preferred method of operation for the apparatus of FIG. 1.

Reference is now made to FIG. 3 which is a flowchart illustrating a preferred method of operation for the apparatus of FIG. 1.

As shown in FIG. 3, the apparatus of FIG. 1 operates in one of three modes, as computed by unit 170 which provides output to control unit 180:

a) a sweeping mode (steps 250, 260, 270, 280, 290 and 300 of FIG. 3), where the laser scanner's entire field of view is scanned and suspect targets ("regions of interest") are determined;

b) a segmentation/correlation mode (steps 320, 330, 340, 350 and 360 of FIG. 3), where a region of interest is scanned at a higher resolution and suspect targets are classified based on a comparison with at least one of a plurality of prestored target signatures. Preferably, a segment is defined and is then correlated with a prestored target segment.

The following reference describes conventional segmentation and correlation methods, including correlation for instances in which the orientation of the target may differ from the orientation of the target image stored in memory:

A. Rosenfeld and A. C. Kak, "Digital Picture Processing", Second Edition, Vol. 2, Academic Press, 1982, pp. 340–346.

If a suspect target is recognized, an estimated locality of a highly characteristic target feature is determined. The locality may be determined by use of prior information regarding the relative location of the highly characteristic target feature within the segment. For example, a tank's turret-barrel junction is typically located not far from the center of the tank's contour when viewed from above. The prediction based on location relative to segment contour may be improved by utilizing 3D imaging information. For example, if a "peak" is found close to the estimated location of the turret-barrel junction, the location of the "peak" may be adopted as a new, improved estimated location.

c) a verification mode (steps 370, 380, 390, 400, 410, 420), where at least a portion of the segment is subjected to a very high resolution scan so that a verification sub-system can compare highly characteristic portions of the segment (such as, for a tank, the estimated location of the barrel-turret junction) with a pre-stored specific target signature thereby determining a confidence level for the verification of a target.

Initially, the LADAR system of the present invention is in the sweeping mode where some or all of the target range is subjected to a low resolution scan, until a region of interest is found at which point the sweeping mode scan is discontinued. In FIG. 3, scan locations within the target range or field of view are termed "scan 1 locations". In FIGS. 2A and 2B, scan 1 locations are represented by circles 210.

Figure 2C:
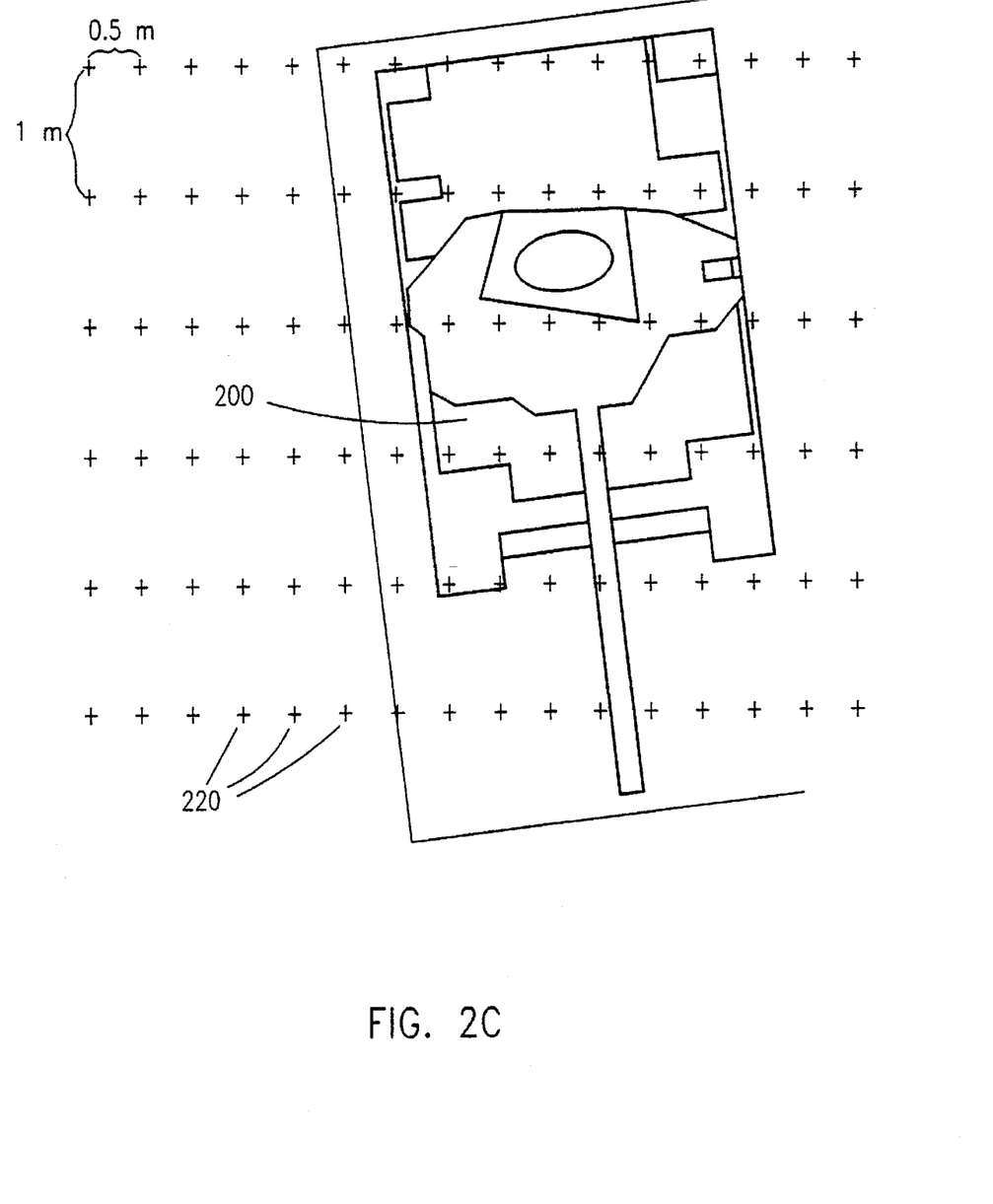
FIG. 2C is an illustration from above of a medium resolution scan of a portion of the field of view performed by the system of FIG. 1 when in the segmentation/correlation mode.

Next, a segmentation/correlation mode scan of the region of interest is performed at medium resolution, the segmentation and correlation computations being performed in parallel, until predetermined segment dimensions are found at which point the segmentation/correlation mode scan is discontinued. In FIG. 3, scan locations within a vicinity of the region of interest are termed "scan 2 locations". In FIGS. 2B and 2C, scan 2 locations are represented by plus signs 220.

Figure 2D:
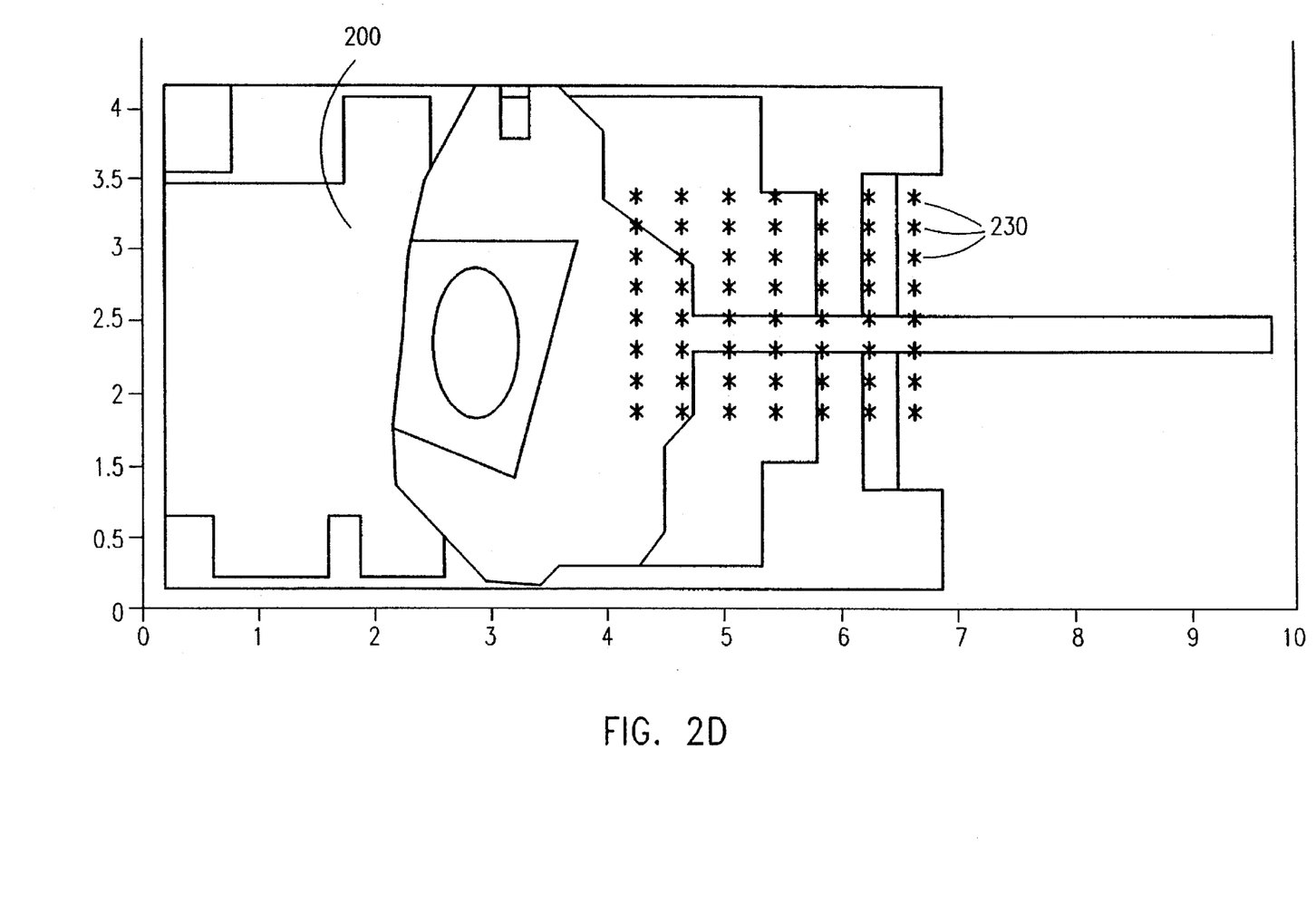
FIG. 2D is an illustration from above of a high resolution scan of a portion of the field of view performed by the system of FIG. 1 when in a verification mode.

Finally, a verification mode scan of at least a portion of the segment is performed at high resolution, until a highly characteristic target feature is found. In FIG. 3, scan locations within the segment are termed "scan 3 locations". In FIG. 2D, scan 3 locations are represented by asterisks 230. Typically verification mode scanning takes place in the vicinity of the estimated locality, within the segment, of the pre-selected highly characteristic target feature.

If the entire field of view is scanned in sweeping mode and no area of interest is found, the system provides a suitable output indication. If an entire area of interest is scanned in segmentation/correlation mode and the predetermined segment dimensions are not found, the system reverts to sweeping mode. If, in verification mode, no highly characteristic target feature is found in the course of scanning a reasonable vicinity of that feature's estimated location, the system reverts to segmentation/correlation mode.

Reference is additionally made to FIGS. 2A through 2D which show examples of scan boundaries and resolutions in various modes of operation of a preferred embodiment of the LADAR system of the present invention as a target is identified and verified.

FIG. 2A depicts a number of objects observed by a low resolution scan of the entire target range. Each circle 210 in FIG. 2A indicates a scan 1 location. Solid lines indicate elevation lines of various objects 135 such as a tower, pole, hill and tank. Preferably, in the sweeping mode, the scan resolution is one pixel per meter of length and one pixel per two meters of width, which is sufficient to determine "regions of interest", such as tank object 200.

In sweeping mode, new scan computation module 170 preferably measures variations in the computed range and/or reflectance values of the image data matrix. The measured variations function as an indicator as to the existence of potential targets. For example, when a computed range value at one point in the matrix is substantially infinite (there being no object) and a pre-selected number of consecutive adjacent points in the matrix have substantially equivalent, finite range values, this variation indicates that a relatively large object exists in the target range. Alternatively or additionally, if a difference in the reflectance between the target and the background is detected in the image data matrix, the cause of such a difference in reflectance is probably due to the detection of a possible target.

Abrupt changes in the computed range and/or reflectance values in the image data matrix indicate the boundaries of an object in the laser scanner's field of view. The size of an object is measured by the object's corresponding boundaries in the image data matrix. The measured size is compared against the size of any of a plurality of pre-stored target signatures, and, if a probable match is found, module 170 changes the scan boundary and resolution parameters to those of the segmentation/correlation mode of operation shown in FIG. 2C.

In the segmentation/correlation mode, shown in FIG. 2C, image computation and storage module 160 preferably displays, on display 165, the boundaries of "regions of interest" in the target range to alert an operator as to possible hazards.

In the segmentation/correlation mode, the segment identified in the segmentation mode is scanned at a higher resolution. Preferably, the scan resolution doubles to two pixels per meter of length and one pixel per meter of width, as depicted in FIG. 2B which illustrates the transition between the low and medium resolution scans. The numbers shown on the outline of the scan frame are (arbitrary) scale dimensions and should not be construed as being target dimensions. In segmentation/correlation mode, the profile of at least a portion of the region is correlated to pre-stored target signatures. Preferably, image computation and storage module 160 displays, on display 165, gray scale range and reflectance images of the scanned segment region, using methods and apparatus well known in the art.

The verification mode is entered when the appropriate criterion (FIG. 3) is met. FIG. 2D depicts a resolution scan used to identify a highly characteristic target feature, such as the gun turret-barrel junction of the tank 200. The numbers shown on the outline of the scan frame are (arbitrary) scale dimensions and should not be construed as being target dimensions.

Preferably, the resolution used is 10 pixels per meter of length and 3 pixels per meter of width. The profile of the highly characteristic region is closely compared, as described in greater detail hereinbelow, with the pre-stored target signature identified in the segmentation/correlation mode to verify the identity of target 200 and to provide a suitable output message or to determine a critical aim point. When the critical aim point is determined, aiming instructions are provided to weaponry or to an operator, preferably through gray scale range and reflectance images of the scanned critical aim point region on display 165.

In a preferred embodiment of the present invention, a learning neural network system is used for comparing the critical aim point region with a pre-stored target signature.

Thus, by continuously narrowing the field of the scan as regions of interest are identified and delineated, as described above, a single laser can be effectively employed to cover a wide field of view.

A particular feature of the present invention is that more than one scanning levels are employed. Each scanning level n is discontinued upon discovery of a putative target which answers to the at least one characterizing criterion of scanning level n. Instead, scanning at level n+1 is initiated, only in the vicinity of the putative target. If the putative target vicinity answers to the at least one criterion of scanning level n+1, scanning level n+1 is discontinued and instead, scanning at level n+2 is initiated. Otherwise, i.e. if the putative target vicinity does not answer to the at least one criterion of scanning level n+1, the system reverts to scanning level n. If a putative target feature does not answer to at least one criterion of scanning level n+2, the system reverts to scanning level n+1.

The particular resolutions suggested herein for each scanning level are not intended to be limiting. In general, if the target is x meters long and y meters wide, a suitable value for the horizontal and vertical resolutions are x/8 and y/8, respectively.

It is appreciated that computational components of the present invention may, if desired, be implemented in ROM (read-only memory) form. The computational components may, generally, be implemented in hardware, if desired, using conventional techniques.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described herein. Rather, the scope of the present invention is defined only by the claims which follow:

I claim:

1. A laser imager for imaging a scene having targets comprising:

a laser scanner operative to scan the scene at a given spacing with a laser beam;

a receiver which receives laser light reflected from the scene and determines the range of an object reflecting said laser light at various scan positions; and control logic which changes the given spacing in response to the determined range.

2. A laser imager for imaging a scene having targets comprising:

a laser scanner operative to scan the scene at a given spacing with the laser beam;

a receiver which receives laser light reflected from the scene and determines the reflectance of an object reflecting said laser light at various scan positions; and control logic which changes the given spacing in response to the determined reflectance.

3. A laser imager according to claim 2 wherein the receiver is also operative to determine the range of an object reflecting said laser light at a scan position, and wherein the control logic is also responsive to the determined variations in range and reflectance.

4. A laser imager according to claim 1 wherein the control logic also changes the resolution of said scan in response to the results of a comparison between an array of values at scan positions and a pre-set array of values representing a target signature.

5. A laser imager according to claim 2 wherein the control logic also changes the resolution of said scan in response to the results of a comparison between an array of values at scan positions and a pre-set array of values representing a target signature.

6. A laser imager according to claim 1 wherein the values at scan positions represent target range.

7. A laser imager according to claim 2 wherein the values at scan positions includes target reflectance values.

8. A laser imager according to claim 1 wherein the laser source is a GaAs type laser.

9. A laser imager according to claim 2 wherein the laser source is a GaAs type laser.

10. A laser imager according to claim 1 wherein the laser source is a NdYaG type laser.

11. A laser imager according to claim 2 wherein the laser source is a NdYaG type laser.

12. A laser imager according to claim 1 wherein the laser source is a NdYLF type laser.

13. A laser imager according to claim 2 wherein the laser source is a NdYLF type laser.

14. A laser imaging system for imaging a scene including targets, the system comprising:

a laser scanner operative to scan the scene at a given resolution with a laser beam;

a laser receiver which receives and analyzes laser light reflected from the scene to determine candidate target locations; and a laser scanner controller operative to increase the resolution of the scan and to pinpoint the scan to at least one candidate target location.

15. A system according to claim 14 and also comprising a target size memory storing target size information wherein the laser receiver determines candidate target locations by comparing the size of identified objects with the target size information.

16. A system according to claim 10 and also comprising a target shape memory storing target shape information wherein the laser receiver determines candidate target locations by comparing the shape of identified objects with the target shape information.

17. A laser imaging method for imaging a scene including targets, the method comprising:

scanning at least a portion of the scene at a first resolution with a laser beam and analyzing the light reflected back, only until a region of interest satisfying at least one general target-characterizing criterion is found; and scanning at least a portion of said region of interest at a second resolution higher than said first resolution with said laser beam, only until a location satisfying at least one specific target-characterizing criterion is found.

18. A method according to claim 14 and also comprising scanning at least a portion of said specific criterion satisfying location at a third resolution higher than said second resolution with said laser beam, only until a highly characteristic target feature is found.

19. A system according to claim 10 and also comprising a target color memory storing target color information wherein the laser receiver determines candidate target locations by comparing the color of identified objects with the target color information.

20. A method for 3D imaging of at least a portion of a scene, the method comprising:

generating a 3D representation of a first portion of the scene at a first resolution; and upon receipt of a control signal, generating a 3D representation of a second portion of the scene at a second resolution.

21. A method according to claim 20 wherein said control signal comprises an indication that a putative target has been encountered.

22. A method according to claim 20 wherein said second resolution is greater than said first resolution.

23. A method according to claim 20 and also comprising the step of generating a 3D representation of a third portion of the scene at a third resolution.

24. A method according to claim 20 wherein generating comprises laser scanning a portion of the scene.

* * * * *